United States Patent [19]

Fast et al.

[11] 4,291,602

[45] Sep. 29, 1981

[54] PANEL CUTTING DEVICE

[75] Inventors: John Fast; Harvey Williams, both of Winnipeg, Canada

[73] Assignee: Educase Incorporated, Winnipeg, Canada

[21] Appl. No.: 123,987

[22] Filed: Feb. 25, 1980

[51] Int. Cl.³ .............................................. B27B 9/04
[52] U.S. Cl. ........................................ 83/745; 83/574
[58] Field of Search ............... 83/745, 471.2, 485, 83/486, 489, 821, 574

[56] References Cited

U.S. PATENT DOCUMENTS

| 2,708,465 | 5/1955 | Ituebner et al. | 83/745 |
| 2,942,633 | 6/1960 | King | 83/745 |
| 3,389,724 | 6/1968 | Payl | 83/745 X |
| 3,830,130 | 8/1974 | Moore | 83/745 |
| 3,869,951 | 3/1975 | Litwin | 83/745 |
| 4,056,028 | 11/1977 | Patterson | 83/745 |
| 4,059,038 | 11/1977 | Rietema | 83/745 |
| 4,224,855 | 9/1980 | Des Roches | 83/745 |

Primary Examiner—J. M. Meister
Attorney, Agent, or Firm—Stanley G. Ade

[57] ABSTRACT

A guide bar is detachably clamped to the panel being cut with a pair of guide plates extending therefrom and registering upon the line to be cut. The guide bar is provided with a longitudinally extending slot or groove into which is engageable a guide block for longitudinal movement therealong. A power saw is detachably securable to the guide block which guides the saw blade along the line to be cut. The guide bar includes an underside clamp and spacer bar which spaces the panel above the supporting surface sufficient to give clearance to the underside of the saw blade as the panel is being cut.

10 Claims, 7 Drawing Figures

U.S. Patent  Sep. 29, 1981  Sheet 1 of 2  4,291,602
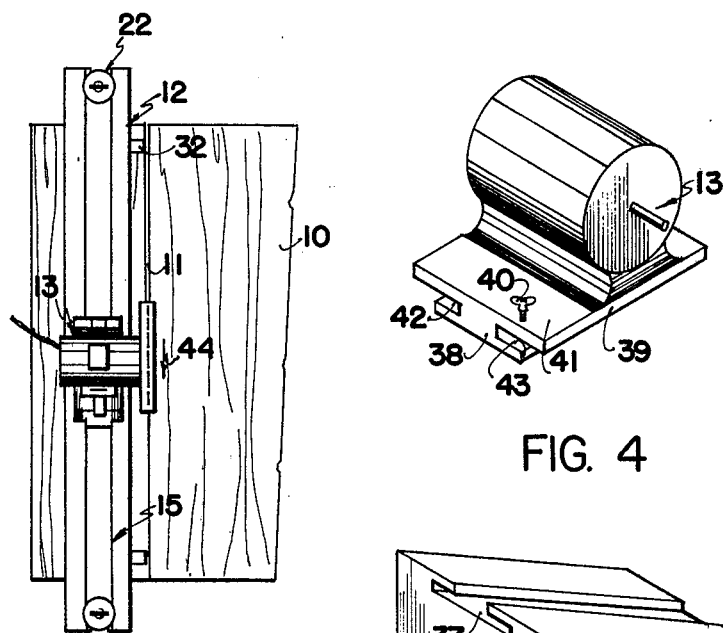
FIG. 1
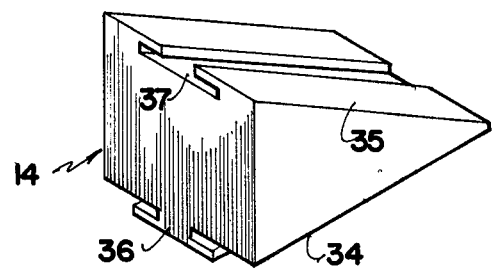
FIG. 4
FIG. 3
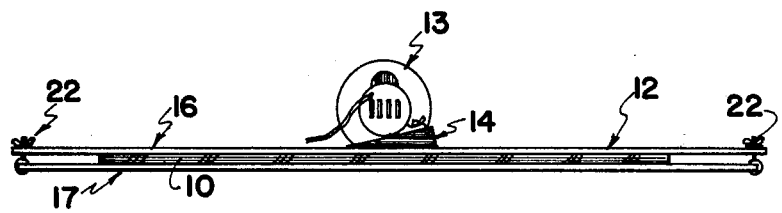
FIG. 2

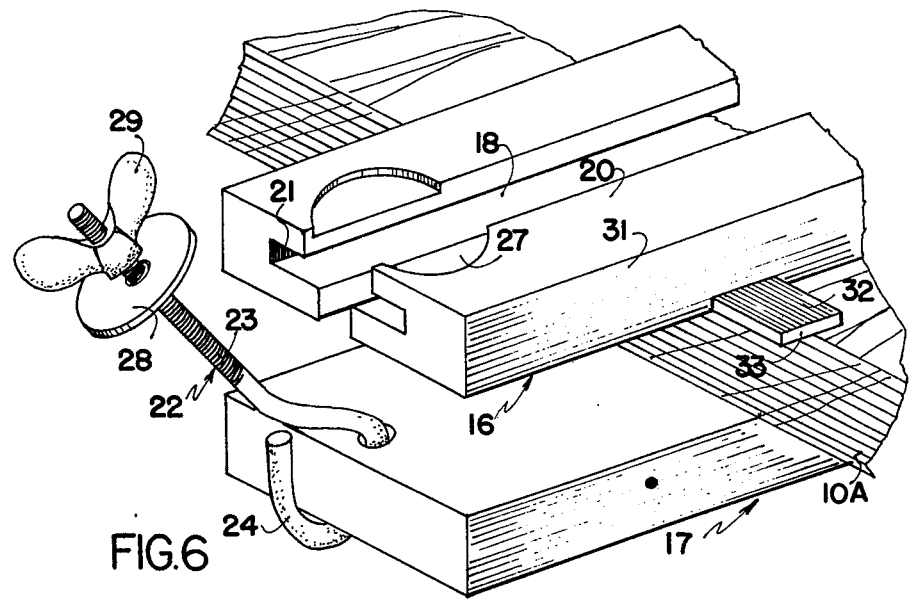
FIG. 6
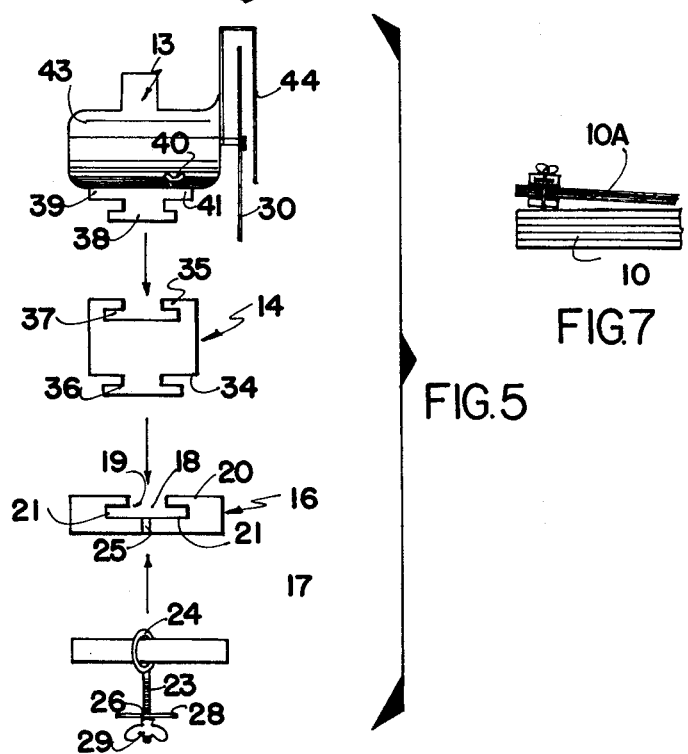
FIG. 5
FIG. 7

PANEL CUTTING DEVICE

BACKGROUND OF THE INVENTION

This invention relates to new and useful improvements in panel cut off devices.

It is well known that it is difficult to cut off portions of a panel, particularly when the panel is relatively thin and flexible. They can be elevated and cut on a radial or bench type saw, but this is awkward once again due to the size and flexibility of the panels so that it is usual to utilize a hand-held electric saw, but once again the panel has to be propped or spaced from the floor or supporting surface and the saw manually guided along the line to be cut. Once again this is difficult and awkward as well as being inaccurate in many cases due to the fact that the saw is hand guided.

The prior art includes various types of saw guides and examples include U.S. Pat. Nos. 4,077,292; 3,045,724; 1,960,590, all of which require a conventional power saw to be used with the sole plate being pushed against the side of a guide bar of one form or the other.

Other devices include U.S. Pat. No. 2,630,147 which comprises a frame supporting the power saw for cutting boards, U.S. Pat. No. 2,708,465 which utilizes a slotted guide, U.S. Pat. No. 3,298,407 which is designed specifically for cutting preformed plastic counter tops and U.S. Pat. No. 3,983,776 which provides a power tool track, upon which a power saw may be moved.

However, none of these are adapted for use on relatively thin flexible panels and one of the advantages of the present device is the fact that a panel may be cut even although it remains stacked in position upon other panels because the guide bar may include spacer means on the underside thereof to elevate the panel sufficiently to allow clearance for the saw blade.

SUMMARY OF THE INVENTION

In accordance with the invention there is provided a panel cutter assembly for use with a power saw comprising in combination a longitudinally extending guide member, means to detachably clamp said guide member to the panel being cut, a panel cutting saw component, means detachably engaging and guiding said saw component for longitudinal movement along said guide member and means extending from one side of said guide member engaging the line to be cut on said panel.

Another advantage of the invention is in fact that the device can be used with a conventional power saw if desired, but is preferably usable with an integral, relatively lightweight power saw attachment.

A still further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is a top plan view of a panel with the device in situ thereon.

FIG. 2 is a side elevation of FIG. 1.

FIG. 3 is an enlarged isometric view of the saw support block per se.

FIG. 4 is an isometric view of the preferred power saw with the base attachment.

FIG. 5 is a schematic front elevation of the assembly in exploded form for clarity.

FIG. 6 is a fragmentary isometric view of one end of the guide member situated upon a panel.

FIG. 7 is a partially schematic fragmentary view of a pile of panels with the device installed thereon showing how the guide bar lifts the top panel for cutting clearance.

In the drawings like characters of reference indicate corresponding parts in the different figures.

DETAILED DESCRIPTION

Proceeding therefore to describe the invention in detail, reference to the drawings will show that 10 illustrates a typical panel with a cut-off line being indicated by reference character 11.

The device collectively designated 12 is situated upon the panel and, in the preferred embodiment, includes a power saw collectively designated 13, a saw support block collectively designated 14, and a guide member collectively designated 15 and including an upper portion collectively designated 16 and a lower portion collectively designated 17.

In detail, and referring first to the guide member, it preferably takes the form of a longitudinally extending upper portion 16 having a mortise type slot 18 formed in the upper surface thereof and extending longitudinally. This mortise type slot presents an inverted T formation when viewed in end elevation as shown in FIG. 5 and includes the upper slot portion 19 opening out onto the upper surface 20 of the portion 16 with horizontally situated wing slots 21 extending from either side of the base of the slot 19.

The lower portion 17 takes the form of an elongated strip, the thickness of which is sufficient to act as a spacer as will hereinafter be described.

Clamp means collectively designated 22 cooperates between the portions 16 and 17 to detachably clamp them in position upon the panel as shown in FIGS. 1 and 2.

The preferred embodiment of the clamp 22 comprises a bolt 23 having an eye 24 at the lower end thereof freely engageable through an aperture adjacent the end of the member 17 so that it may pivot from the lowermost position illustrated in FIG. 5 to the clamping position illustrated in FIGS. 1 and 2. A relatively short entry slot 25 is formed in each end of the upper portion 16 of the guide member to receive the shank 26 of the bolt when it is hinged upwardly into the clamping position and a circular or cylindrical recess 27 is formed in the upper surface of the upper portion 16 adjacent the end thereof to receive a washer 28 engaging the shank thereby locating the portions 16 and 17 in the desired relationship. A wing nut 29 engages the screw threaded shank and is tightened to clamp the portions 16 and 17 to the panel with the portion 16 lying on the upper surface and the portion 17 being situated underneath the panel. Reference to FIG. 7 will show how the lower portion 17 also acts as a spacer to elevate the upper panel 10A sufficiently clear of the remaining panels 10 to supply clearance for the lower run of the saw blade 30 as will hereinafter be described.

Extending outwardly from the side 31 of the upper portion 16 is a pair of plates 32 one adjacent each end thereof and the width of these plates is such that when the saw component 13 is in position upon the device, the saw 30 is situated on a line extending between the extremities 33 of the plates and that which represents the cutting line 11.

The saw support block 14 is shown in detail in FIG. 3 and is preferably wedge-shaped when viewed in side elevation having a horizontal base 34 and an upwardly and forwardly inclining upper surface 35.

An inverted T shaped projection 36 is formed on the base 34 and extends downwardly therefrom and from end to end of the block and this projection 36 slidably engages the elongated slot 18 formed in the upper portion 16 of the guide member.

A similar inverted T shaped slot 37 is formed in the upper surface 35 of block 14 and slidably receives an inverted T shaped projection 38 formed on the underside of the base plate 39 of the saw component 13 and this projection 38 slidably engages the slot 37 so that the saw component 13 may be located on block 14. A screw threaded wing bolt 40 engages aperture within the upper portion 41 of the base plate and extends into one side of the horizontal portion 42 defined by the base plate 39 and one offstanding wing 43 of the projection 38 and the lower end of this wing bolt 40, when tightened, engages the upper surface 35 of the block and locks the saw component in position upon the block.

The saw component 13 is preferably a relatively lightweight power saw including a power shown schematically by reference character 43 directly driving a saw blade 30 on one side thereof covered by a guard 44.

In use, the guide member 12 is clamped in position upon the panel to be cut with the extremities 33 of the plates 32 lying on line 11 whereupon the guide member 12 is clamped into position by means of clamps 22 as hereinbefore described.

This also elevates the panel 10A clear of the supporting surface or other panels 10 as shown in FIG. 7.

The saw component 13 is then engaged with block 14 and clamped in position by means of the wing bolt 40 whereupon the block itself is slidably engaged within the elongated slot 18 on the upper side of the guide member.

The power saw 13 is connected to a source of power (not illustrated) and moved along the slot in the direction of arrow 44 thus cutting off the portion of the panel along the line 11 with the saw blade being maintained accurately in the desired line.

Although FIG. 1 shows the device situated upon what appears to be the narrow portion of the panel being cut off, nevertheless it will be appreciated that by reversing the assembly, the assembly can be secured to the larger portion of the panel which is the desirable condition, if possible.

Since various modifications can be made in our invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What we claim as our invention is:

1. A panel cutter assembly for use with a power saw comprising in combination a longitudinally extending guide member, means to detachably clamp said guide member to the panel being cut, a panel cutting saw component, means detachably engaging and guiding said saw component for longitudinal movement along said guide member and means extending from one side of said guide member engaging the line to be cut on said panel, said means detachably engaging and guiding said saw component including a longitudinally extending slot formed in the upper surface of said guide member and means extending from said panel cutting saw component slidably engaging said slot, said slot being in the form of a mortise slot having a relatively narrow upper portion opening onto the upper surface of said guide member and a pair of horizontally situated wing slots extending one upon each side of the base of said upper portion and communicating therewith to present an inverted T formation when viewed in end elevation.

2. The panel cutter assembly according to claim 1 in which said guide member includes an upper portion for placement on the upper surface of the panel to be cut, and a lower portion for engagement under the panel being cut, said clamp means cooperating between said portions to clamp same in position upon said panel, said lower portion also acting as a spacer elevating the panel above a supporting surface to give sufficient clearance for the saw blade of the power saw.

3. The panel cutter assembly according to claim 1 in which said panel cutting saw component includes a saw support block, means on the underside thereof slidably engaging said means for detachably engaging and guiding said saw component, and means on the upper side of said saw support block to detachably secure the power saw.

4. The panel cutter assembly according to claim 2 in which said panel cutting saw component includes a saw support block, means on the underside thereof slidably engaging said means for detachably engaging and guiding said saw component, and means on the upper side of said saw support block to detachably secure the power saw.

5. The panel cutter assembly according to claim 3 in which said block is wedge shaped when viewed in side elevation and includes a horizontal base and an upwardly and forwardly inclining upper surface.

6. The panel cutter assembly according to claim 4 in which said block is wedge shaped when viewed in side elevation and includes a horizontal base and an upwardly and forwardly inclining upper surface.

7. The panel cutter assembly according to claims 1 or 2 in which said panel cutting saw component includes a power saw detachably secured thereto.

8. The panel cutter assembly according to claims 3, 7 or 5 in which said panel cutting saw component includes a power saw detachably secured thereto, said power saw being detachably secured to said saw support block, said saw support block including an inverted T shaped slot in the upper surface thereof, said power saw including a base plate having a T shaped configuration slidably engageable with said inverted T shaped slot in said block and a clamp operatively extending between said base plate and said block to detachably clamp said power saw to said block.

9. The panel cutter assembly according to claim 6 in which said panel cutting saw component includes a power saw detachably secured thereto, said power saw being detachably secured to said saw support block, said saw support block including an inverted T shaped slot in the upper surface thereof, said power saw including a base plate having a T shaped configuration slidably engageable with said inverted T shaped slot in said block and a clamp operatively extending between said base plate and said block to detachably clamp said power saw to said block.

10. The panel cutter assembly according to claims 2, 7 or 6 in which said clamp means includes a slot in the end of said upper portion, a pivot bolt pivotally secured to adjacent the end of said lower portion engaging within said last mentioned slot, and a clamp nut and washer assembly engaging said clamp bolt and the upper surface of said lower portion when tightened.

* * * * *